(12) United States Patent
Wilks

(10) Patent No.: US 7,158,094 B2
(45) Date of Patent: Jan. 2, 2007

(54) METHOD AND APPARATUS FOR SUPPORTING MULTIPLE DISPLAYS

(75) Inventor: Barry G. Wilks, Markham (CA)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/182,911

(22) Filed: Oct. 30, 1998

(65) Prior Publication Data

US 2001/0011965 A1 Aug. 9, 2001

(51) Int. Cl.
*G09G 5/00* (2006.01)
(52) U.S. Cl. ............... 345/1.1; 345/530; 345/698
(58) Field of Classification Search ............ 345/1, 345/2, 3.4, 1.1, 1.2, 2.2, 3.3, 690, 699, 530, 345/531, 532, 533, 534, 535, 538, 541, 542, 345/545, 547, 698
See application file for complete search history.

(56) References Cited

U.S. PATENT DOCUMENTS

| | | | | |
|---|---|---|---|---|
| 4,990,902 A | * | 2/1991 | Zenda | 345/698 |
| 5,585,821 A | * | 12/1996 | Ishikura et al. | 345/145 |
| 5,694,150 A | * | 12/1997 | Sigona et al. | 345/145 |
| 5,923,307 A | * | 7/1999 | Hogle, IV | 345/4 |
| 6,018,340 A | * | 1/2000 | Butler et al. | 345/339 |
| 6,067,071 A | * | 5/2000 | Kotha et al. | 345/213 |
| 6,104,359 A | * | 8/2000 | Endres et al. | 345/3.1 |
| 6,108,014 A | * | 8/2000 | Dye | 345/507 |

FOREIGN PATENT DOCUMENTS

FR  ED-4441745  * 6/1995

* cited by examiner

*Primary Examiner*—Richard Hjerpe
*Assistant Examiner*—Jean Lesperance
(74) *Attorney, Agent, or Firm*—Vedder, Price, Kaufman & Kammholz, P.C.

(57) ABSTRACT

A method and apparatus for supporting multiple displays per a drawing surface begins by receiving capability parameters regarding a first display of the multiple displays. The capability parameters include resolution, pixel depth, and/or refresh rate. Typically, the first display will be the primary display associated with a video graphics card. The processing continues by substituting selected display capabilities for the capability parameters of the first display. The selected display parameters are such that it exceeds the display capability parameters of each display, or monitor, coupled to the video graphics card. The processing continues by providing the selected display capabilities to an operating system. The operating system then stores the selected display capabilities in the display register associated with a particular video graphics card.

31 Claims, 2 Drawing Sheets

METHOD AND APPARATUS FOR SUPPORTING MULTIPLE DISPLAYS

TECHNICAL FIELD OF THE INVENTION

This invention relates generally to video graphics and more particularly to supporting multiple displays from a single drawing surface.

BACKGROUND OF THE INVENTION

Computers are known to comprise of a central processing unit, system memory, audio processing circuitry, peripheral ports, and video processing circuitry. The peripheral ports allow the central processing unit to communicate with peripheral devices such as monitors, printers, external tape drives, the internet, etc. Video graphics circuitry functions as a co-processor to the central processing unit to perform video graphic functions. As such, the video graphics processor receives graphical data generated by the central processing unit and renders the graphical data into pixel data that is subsequently displayed on a monitor.

Video graphic circuitry may be coupled to a single display or to multiple displays. When coupled to a single display, a frame buffer holds the pixel data that is subsequently provided to the display. Typically, the pixel data is mapped into the frame buffer based on physical parameters of the monitor (e.g., resolution and X, Y coordinates). The mapping of the frame buffer may be linear mapping or tile mapping. Regardless of the mapping technique, the display presents, in a full screen, the image or images stored in the frame buffer.

When the video graphics processing circuit is supplying pixel data to multiple displays, one or more of the displays may be operating in a virtual desktop mode. A display will operate in a virtual desktop mode when its resolution does not match the resolution of one or more of the other multiple displays. Typically, the display operating in a virtual desktop mode has a lower resolution than the primary display, thus it is too small to display the full image of the data stored in the frame buffer. When in the virtual desktop mode, only a portion of the image in the frame buffer is presented on screen. To view other portions of the image, a mouse, or other GUI action is performed.

As is known, the virtual desktop mode enables a lower resolution display to display larger resolution drawing surfaces. As such, when in the virtual desktop mode, only a portion of the image in the frame buffer is presented on screen. To view other portions of the image, a mouse, or other GUI action is performed. However, to support multiple displays, and/or the virtual desktop mode, requires modification of the operating system interface, does not allow upgrading of the operating system without reconfiguring the interface, and is complex. Obviously, such intrusions on the operating system are less than desirable and limit commercial viability.

As is known, a computing system may include a plurality of video graphics cards, each having a separate display register associated with the operating system. If each card is supporting a single display, all of the displays operate in full screen mode, i.e., not functioning in a virtual desktop mode. Each card, however, may support multiple displays, recreating the above mentioned virtual desktop operations.

Therefore, a need exists for a method and apparatus that supports multiple displays operably coupled to a single drawing surface to support virtual desktop mode without the complexity or interface changes needed in current implementations and without limiting displays having greater capabilities.

DETAILED DESCRIPTION OF A PREFERRED EMBODIMENT

Generally, the present invention provides a method and apparatus for supporting multiple displays per a drawing surface. Such processing begins by receiving capability parameters regarding a first display of the multiple displays. The capability parameters include resolution, pixel depth, and/or refresh rate. Typically, the first display will be the primary display associated with a video graphics card. The processing continues by substituting selected display capabilities for the capability parameters of the first display. The selected display parameters are such that it exceeds the display capability parameters of each display, or monitor, coupled to the video graphics card. The processing continues by providing the selected display capabilities to an operating system. The operating system then stores the selected display capabilities in the display register associated with a particular video graphics card. With such a method and apparatus, substituting the display parameters of a single display with all encompassing display parameters, allows a multitude of displays to be coupled to a single drawing surface without limiting displays having greater display capabilities and overcoming the intrusions into the operating system.

Figure 1:
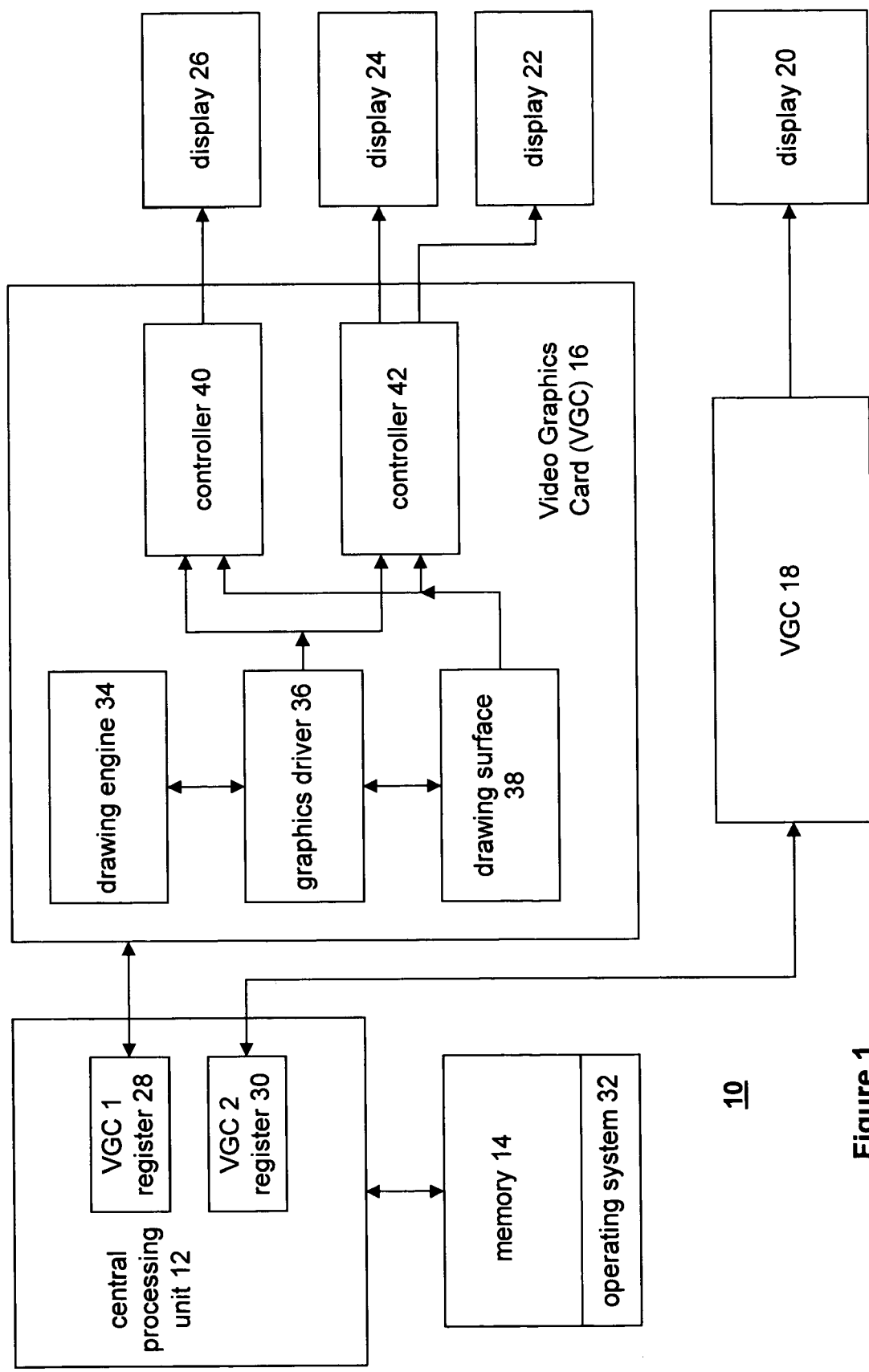
FIG. 1 illustrates a schematic block diagram of a computing system in accordance with the present invention.

The present invention can be more fully described with reference to FIGS. 1 through 3. FIG. 1 illustrates a schematic block diagram of a computing system 10. Such a computing system 10 may be a personal computer, laptop computer, video game, personal digital assistant, palm top computer, hand-held computer and/or any device that performs programs and or algorithms. The computing system 10 includes a central processing unit 12, system memory 14, a first video graphics card 16, a second video graphics card 18, and a plurality of displays 20–26. The central processing unit 12 includes a first video graphics register 28 and a second video graphics register 30. Each of these registers is operably associated with one of the video graphics cards and stores display capability parameters of the primary display associated with the video graphics card. Note that in accordance with the present invention the display capability parameters of a primary display will be overwritten within these registers by the selected display capabilities.

The system memory 14 stores an operating system algorithm 32. As is known, the operating system 32 functions to start up the computing system 10 and to maintain operation. As part of the start-up procedure, the operating system 32 provides inquiries to the video graphics cards 16 and 18 to obtain the display capability parameters of a primary display associated therewith. In accordance with the present invention, the video graphics cards 16 and 18 will provide, during some portion of execution of the operating system start-up, the selected display capabilities. The providing of the selected display capabilities will be discussed in greater detail with reference to FIGS. 2 and 3.

The video graphics card 16 is a representative schematic block diagram of the video graphics cards that may be incorporated in the computing system 10. Video graphics card 16 includes a drawing engine 34, a graphics driver 36, a drawing surface 38, a first controller 40, and a second controller 42. As shown, controller 40 is operably coupled to display 26 and controller 42 is operably coupled to displays 22 and 24. As such, the video graphics card 16 supports three displays. Each of the displays may be driven from the drawing surface 38 such that they each display the same images.

In operation, the drawing engine 34 receives graphical data from the central processing unit 12 and/or video inputs from a video decoder and processes them into RGB data. The graphics driver 36 receives the RGB data and coordinates the storage within the drawing surface 38. In addition, the graphics driver 36 coordinates the retrieval of the RGB data from the drawing surface 38 and provides it to controllers 40 and/or 42. Note that the central processing unit 12 may provide the same or different graphics data to the video graphics cards 16 and 18. As one of average skill in the art would readily appreciate, the computing system 10 may include a single video graphics card that supports multiple displays and/or multiple video graphics cards that each support a single or multiple displays.

Figure 2:
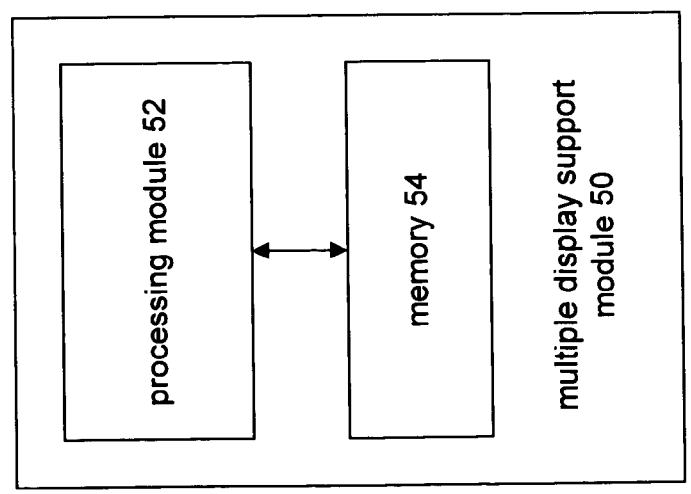
FIG. 2 illustrates a schematic block diagram of a multiple display support module in accordance with the present invention.

FIG. 2 illustrates a schematic block diagram of a multiple display support module 50 that includes a processing module 52 and memory 54. The multiple display support module 50 may be incorporated in the central processing unit and/or on the video graphics card. The processing module 52 may be a single processing entity or a plurality of processing entities. Such a processing entity may be a microprocessor, microcontroller, microcomputer, digital signal processor, a portion of the central processing unit, digital signal processor, state machine, logic circuitry and/or any device that manipulates digital information based on operational instructions. The memory 54 may be a single memory device or a plurality of memory devices. Such a memory device may be a read-only memory, random access memory, floppy disk memory, a portion of the system memory, CD memory, DVD memory, magnetic tape memory and/or any device that stores digital information. Note that if the processing module includes a state machine and/or logic circuitry to perform one or more of its functions, the memory that stores the corresponding operational instructions is embedded within the circuitry that comprises the state machine and/or logic circuitry.

The memory 54 stores operational instructions that, when executed by the processing module causes the processing module 52 to support multiple displays per a drawing surface. Such operational instructions may be further described with reference to FIG. 3.

Figure 3:
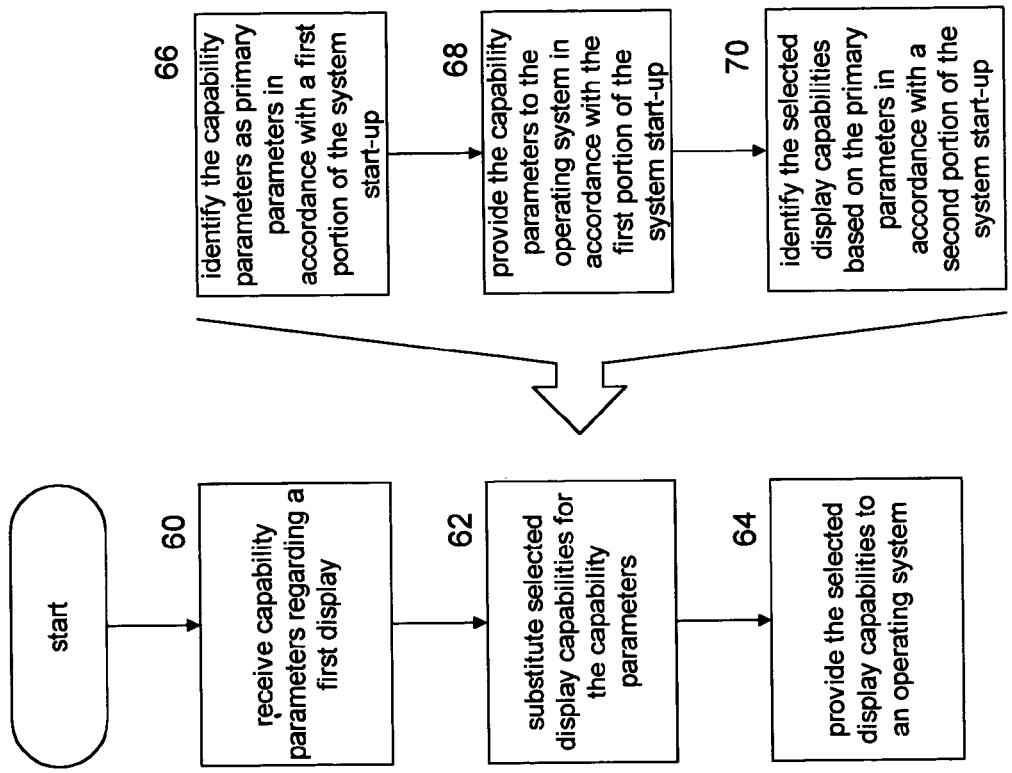
FIG. 3 illustrates a logic diagram of method for supporting multiple displays per drawing surface in accordance with the present invention.

FIG. 3 illustrates a logic diagram of a method for supporting multiple displays per drawing surface. The process begins at step 60 where capability parameters regarding a first display are received. The receiving of the capability parameters, which include resolution, pixel depth, and/or refresh rate, may be received in accordance with a system start-up controlled by the operating system or in response to a monitor change process. Such a monitor change process may be, for example, switching from an LCD display only to an LCD and CRT display mode.

The processing continues at step 62 where selected display capabilities are substituted for the capability parameters. The selected display capabilities include display parameters that exceed the display capabilities of each of the multiple displays coupled to the computing system 10. For example, if the computing system 10 has three displays coupled to a single video graphics card, where the first display has a pixel resolution of 640×480, the second 720×540 and the third 1024×768, the selected display capabilities would have a resolution at least as great as 1024×768 and may further be increased to 1920×1440 or higher. As such, the selected display capabilities may be determined based on a composite of the display parameters of each of the multiple displays, such as an average, a maximum display parameters, or default maximum display parameters. Alternatively, the selected display parameters may be determined based on capabilities of the video graphics card, for example, the video graphics card may be capable of handling a certain size display.

The process then proceeds to step 64 where the selected display capabilities are provided to the operating system. The operating system, upon receiving the selected display capabilities, causes them to be stored in a video graphics register associated with a particular video graphics card.

Step 66 through 70 illustrate one possible implementation of the substitution as performed at step 62. At step 66, the capability parameters of the first display are identified as primary parameters in accordance with a first portion of the system start-up. As such, during the start-up and prior to boot up of the video graphics card, or boot up of a computing system, the operating system requests that each video graphics card provide its primary display parameters to the associated registers. The process then proceeds to step 68 where the capability parameters are provided to the operating system in accordance with the first portion of the system start-up. As such, the primary parameters are provided to the operating system and stored in the corresponding register of the operating system. The process then proceeds to step 70 where the selected display capabilities are identified based on the primary parameters in accordance with a second portion of the system start-up. The second portion of the system start-up corresponds to when the video graphics controller is being booted up such that it may provide the selected display capabilities to the associated register of the operating system thereby overriding the primary parameters with the selected display capabilities.

The preceding discussion has presented a method and apparatus for supporting multiple displays per drawing surface. By utilizing selected display capabilities, which exceeds the display parameters of the displays coupled to the video graphics card, the CPU generates the graphics data based on the selected parameters. As such, the video graphics card, or controller, can process the graphics data such that each of the displays operates in full screen mode or in a virtual desktop mode. In addition, the operating system interface does not have to be modified to enable the virtual desktop mode and is done with much less complexity. As one of average skill in the art would appreciate, other embodiments of the present invention may be derived from the preceding discussion without deviating from the spirit of the present invention.

What is claimed is:
1. A method for supporting multiple displays per drawing surface, the method comprises the steps of:
  a) receiving display capability parameters of a first display of the multiple displays, wherein the display capability parameters comprise display resolution and display pixel depth;

b) substituting selected display capabilities of a second display of the multiple displays for the received display capability parameters of the first display; and c) providing the selected display capabilities to an operating system;

d) using the selected display capabilities of the second display with said first display and wherein step (a) further comprises receiving the capability parameters in accordance with a system start-up; and e) displaying at least a portion of the drawing surface on both of the multiple displays.

2. The method of claim 1, wherein step (b) further comprises, in order:

identifying the capability parameters as primary parameters in accordance with a first portion of the system start-up;

providing the capability parameters to the operating system in accordance with the first portion of the system start-up; and identifying the selected display capabilities as the primary parameters in accordance with a second portion of the system start-up.

3. The method of claim 1, wherein step (a) further comprises receiving the capability parameters in response to a monitor change process.

4. The method of claim 1, wherein the selected display capabilities include display parameters that exceed the display parameters of each of the multiple displays.

5. The method of claim 1, wherein step d) includes using selected display capabilities which exceed the display parameters of the multiple displays.

6. A multiple display supporting module for supporting multiple displays per drawing surface comprises:

a processing module; and memory operably coupled to the processing module, wherein the memory includes operational instructions that cause the processing module to: (a) receive capability parameters regarding a first display of the multiple displays, wherein the capability parameters comprise display resolution and display pixel depth; (b) substitute selected display capabilities of a second display for the received capability parameters of the first display; and (c) provide the selected display capabilities of the second display to an operating system;

wherein the memory further comprises operational instructions that cause the processing module to determine the selected display capabilities of a second display based on a composite of the display parameters of each of the multiple displays to allow displaying of at least a portion of the drawing surface on both of the multiple displays.

7. The multiple display supporting module of claim 6, wherein the memory further comprises operational instructions that cause the processing module to receive the capability parameters in accordance with a system start-up.

8. The multiple display supporting module of claim 7, wherein the memory further comprises operational instructions that cause the processing module to, in order:

identify the capability parameters as primary parameters in accordance with a first portion of the system start-up;

provide the capability parameters to the operating system in accordance with the first portion of the system start-up; and identify the selected display capabilities as the primary parameters in accordance with a second portion of the system start-up.

9. The multiple display supporting module of claim 6, wherein the memory further comprises operational instructions that cause the processing module to receive the capability parameters in response to a monitor change process.

10. The multiple display supporting module of claim 6, wherein the selected display capabilities include display parameters that exceed the display parameters of each of the multiple displays.

11. A digital storage medium for storing operational instructions that cause a processing module to support multiple displays associated with a drawing surface, the digital storage medium comprises:

first storage means for storing operational instructions that cause the processing module to receive capability parameters regarding a first display of the multiple displays, wherein the capability parameters comprise display resolution and display pixel depth;

second storage means for storing operational instructions that cause the processing module to substitute selected display capabilities for the capability parameters;

third storage means for storing operational instructions that cause the processing module to provide the selected display capabilities to an operating system; and fourth storage means for storing operational instructions that cause the processing module to determine the selected display capabilities based on a composite of the display parameters of each of the multiple displays to allow displaying of at least a portion of the drawing surface on both of the multiple displays.

12. The digital storage medium of claim 11 further comprises means for storing operational instructions that cause the processing module to determine the selected display capabilities based on capabilities of a video graphics card.

13. The digital storage medium of claim 11 further comprises means for storing operational instructions that cause the processing module to receive the capability parameters in accordance with a system start-up.

14. The digital storage medium of claim 13 further comprises means for storing operational instructions that cause the processing module to, in order:

identify the capability parameters as primary parameters in accordance with a first portion of the system start-up;

provide the capability parameters to the operating system in accordance with the first portion of the system start-up; and identify the selected display capabilities as the primary parameters in accordance with a second portion of the system start-up.

15. The digital storage medium of claim 11 further comprises means for storing operational instructions that cause the processing module to receive the capability parameters in response to a monitor change process.

16. The method of claim 11 wherein the capability parameters further comprise a display refresh rate.

17. A method for supporting multiple displays per drawing surface, the method comprises the steps of:

a) receiving capability parameters for each display of the multiple displays, wherein the capability parameters comprise display resolution and display pixel depth;

b) determining selected display capabilities of a first display based on the capability parameters of each display of the multiple displays;

c) substituting the selected display capabilities of a second display for the capability parameters of said first display of the multiple displays; and d) providing the selected display capabilities of the second display to an operating system and using the display capabilities of the second display with each of said multiple displays; and wherein step (a) further comprises receiving the capability parameters in accordance with a system start-up; and c) displaying at least a portion of the drawing surface on both of the multiple displays.

18. The method of claim 17, wherein step (b) further comprises, in order:

identifying the capability parameters as primary parameters in accordance with a first portion of the system start-up;

providing the capability parameters to the operating system in accordance with the first portion of the system start-up; and identifying the selected display capabilities as the primary parameters in accordance with a second portion of the system start-up.

19. The method of claim 17, wherein step (a) further comprises receiving the capability parameters in response to a monitor change process.

20. The method of claim 17, wherein the selected display capabilities include display parameters that exceed the display parameters of each of the multiple displays.

21. The method of claim 17, wherein the selected display capabilities include display parameters that exceed the display parameters of each of the multiple displays.

22. A multiple display supporting module comprises:

a processing module; and memory operably coupled to the processing module, wherein the memory includes operational instructions that cause the processing module to execute the steps of:

a) receiving capability parameters for each display of the multiple displays, wherein the capability parameters comprise display resolution and display pixel depth;

b) determining selected display capabilities of a first display based on the capability parameters of each display of the multiple displays;

c) substituting the selected display capabilities of a second display of multiple displays for the capability parameters of the first display of the multiple displays; and d) providing the selected display capabilities of the second display to an operating system for use with multiple displays and wherein the memory further comprises operational instructions that cause the processing module to receive the capability parameters in accordance with a system start-up.

23. The multiple display supporting module of claim 22, wherein the memory further comprises operational instructions that cause the processing module to, in order:

identify the capability parameters as primary parameters in accordance with a first portion of the system start-up;

provide the capability parameters to the operating system in accordance with the firsts portion of the system start-up; and identify the selected display capabilities as the primary parameters in accordance with a second portion of the system start-up.

24. The multiple display supporting module of claim 22, wherein the memory further comprises operational instructions that cause the processing module to receive the capability parameters in response to a monitor change process.

25. A method for supporting multiple displays per drawing surface, comprising:

receiving capability parameters regarding at least a first display of the multiple displays through a corresponding video graphics card;

substituting the display parameters of a second display for the received capability parameters of said first display; and providing the selected display capability parameters of said second display to an operating system and using the display parameters of said second display with other displays of the multiple displays and wherein the display capability parameters are received in accordance with system start-up.

26. The method of claim 25, wherein the substituting step further comprises:

identifying the display capability parameters as primary parameters in accordance with a first portion of the system start-up;

providing the display capability parameters to the operating system in accordance the first portion of the system start-up;

identifying the selected display capability parameters as the primary parameters in accordance with a second portion of the system start-up.

27. The method of claim 25, wherein the receiving step if performed in response to a monitor change process.

28. The method of claim 25, wherein the selected display capability parameter is determined by display parameters that exceed the display parameters of each of the multiple displays.

29. A multiple display supporting module, comprising:

a processing module; and a memory operably coupled to the processing module, wherein the memory includes operational instructions that when executed cause the processing module to: (a) receive capability parameters regarding at least a first display of the multiple displays from a corresponding video graphics card; (b) substituting display parameters of a selected second display for the received display capability parameters of the first display; and (c) providing the selected display capability parameters of the second display to an operating system for use with said first display;

wherein the memory further includes operational instructions that when executed cause the processing module to determine the selected display capability parameters based on a composite of the display parameters of each of the multiple displays; and wherein the memory further includes operational instructions that when executed cause the processing module to receive the display capability parameters in response to a monitor change process.

30. The module of claim 29, wherein the memory further includes operational instructions that when executed cause the processing module to receive the display capability parameters in accordance with a system start-up.

31. The module of claim 30, wherein the memory further includes operational instructions that when executed cause the processing module to: (a) identify the display capability parameters as primary parameters in accordance with a first portion of the system start-up; (b) provide the capability parameters to the operating system in accordance with the first portion of the system start-up; and (c) identify the selected display capability parameters as the primary parameters in accordance with a second portion of the system start-up.

* * * * *